Jan. 20, 1953 R. S. BARBER 2,626,174
DETACHABLE HANDLE FOR CONTAINERS
Filed Nov. 15, 1949
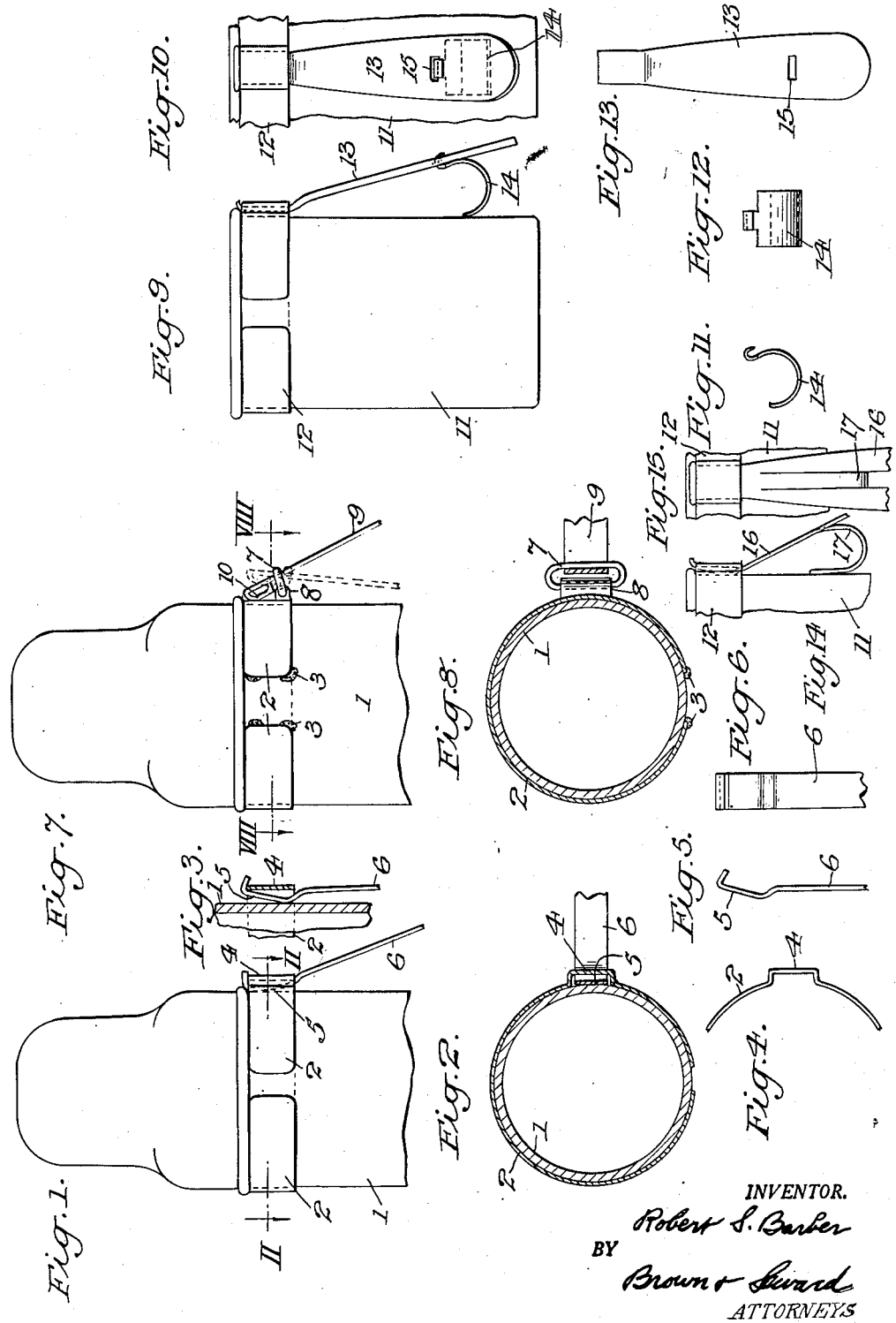
INVENTOR.
Robert S. Barber
BY
Brown & Seward
ATTORNEYS Patented Jan. 20, 1953

2,626,174

UNITED STATES PATENT OFFICE 2,626,174

DETACHABLE HANDLE FOR CONTAINERS

Robert S. Barber, New London, Conn.

Application November 15, 1949, Serial No. 127,353

3 Claims. (Cl. 294—27)

The invention relates to handles for vacuum bottles, containers, cans, or the like, which may easily be applied thereto and, in some cases, are removable therefrom as desired. It is well known that the diameter, size and smooth outer surface of vacuum bottles and other containers makes the handling of same, when filled, difficult, especially in cold or wet weather. This is particularly so when the size of a person's hand renders it difficult to obtain a firm grasp on the bottle. To overcome this difficulty I have invented a simple but effective handle which may be either removably or permanently attached.

The object of the invention is to provide an article of this type which, in its attached but inoperative position, normally assumes a vertical dependent relationship with the side wall of the vacuum bottle or other container so that same may be easily inserted in or removed from a carrying case.

Another object is to provide an article of this type in which the dependent handle is readily available and accessible for use when the bottle is but partway removed from its case.

Another object is to provide an article of this type which may be permanently affixed to the bottle or container for more or less continuous usage, which handle assumes or is maintained in operative position spaced at an angle from the side wall of the bottle or container by means of a resilient actuator therefor.

Another object is to provide a handle comprising a plurality of parts capable of quick assembly into cooperative relationship on the bottle or container, the configuration of the parts enabling same to be removably and swingably related for operation as a handle whose swingable motion is limited to its most effective operative position by its configuration.

A further object is to provide a handle of the type described which is simple in design, easy to manufacture and attach to the desired container and which provides a very effective means whereby the above and other desired objects may be attained.

Broadly, my invention comprises a strap or clip of suitable material for removably or permanently engaging the vertical container sides and being adapted to receive or have mounted thereon a swingable dependent handle portion of predetermined shape, though preferably substantially flat and straight throughout the major portion of its length. Said handle may be crimped, beaded or otherwise formed to accomplish the desired result.

Referring to the accompanying drawings illustrating practical embodiments of the invention:

Fig. 1 represents a detail side elevation of a portion of a container having my improved holder applied thereto, as in use.

Fig. 2 represents a horizontal section taken in the plane of the lines II—II of Fig. 1, looking in the direction of the arrows.

Fig. 3 represents a detail vertical section taken through the clip when the handle is not in use.

Fig. 4 represents a detail plan view of a portion of the clip for receiving the handle.

Figs. 5 and 6 represent a detail side elevation and front views of the handle.

Fig. 7 represents a detail side elevation of a modified form of holder showing the clip permanently fixed to the container by soldering, brazing or spot welding.

Fig. 8 represents a horizontal section taken in the plane of the line VIII—VIII of Fig. 7, looking in the direction of the arrows.

Fig. 9 represents a side elevation of a still further modification of another form of holder having a handle spring pressed to hold it in its usable position.

Fig. 10 represents a detail front elevation of a portion of the same.

Figs. 11 and 12 represent a side and front elevation of the spring as shown in Figs. 9 and 10.

Fig. 13 represents a front elevation of the handle.

Fig. 14 represents a side elevation of a modified form of handle.

Fig. 15 represents a front elevation, showing same in operative position.

The container body 1 is provided with a clip 2, preferably of resilient material, which may either be removably (see Figs. 1, 2 and 9) or permanently attached, as by spot welding, designated by 3 (see Figs. 7 and 8). The form shown in Figs. 1 to 6 inclusive comprises the clip 2 having a bent-out portion 4 adapted to receive and hold the bent-in or otherwise shaped inner end portion 5 at the upper offset end of a handle 6 which cooperates with the bent out portion 4 and with the body side wall to limit the outward throw of handle 6 to its most efficient operative position. The portion of the offset upper end portion that is connected to the upper extremity is disposed substantially perpendicular thereto and its lower end portion terminates in an angled connection with said handle, said angled connection engaging the container body when the handle is disposed in a substantially parallel position with respect to the body of the container when the handle is not in use, said angled connection engaging the bottom edge of said bent out portion 4 when the handle is in use. The handle 6 is placed in position to cause one surface of its shaped inner end portion 5 to engage the bend 4 when clip 2 is slid onto body 1 and its shape, as described above, assists in retaining it in place for use, when desired (see Fig. 3). This simple construction permits the parts to be shipped in their disengaged position and also allows the substitution of either, should one of the parts become misshapen from one cause or another. When the parts assume the position shown in Fig. 3, i. e., a substantially vertical depending position, the vacuum bottle may be easily inserted in or removed from its carrying case. It should be noted that the shape of the upper end of handle 6 is of particular importance as it determines the positions, in conjunction with the bent-out portion 4 of clip 2, which the handle 6 may assume. It is maintained in its positions either by hanging normally from the clip 2 with the upper extremity of its offset end portion engaging the top of said bent out portion or cooperating with the bend 4 at its bottom edge and the contained wall, as described above.

A modified form of my invention is shown in Figs. 7 and 8 in which the clip 2 is provided with a ring 7 which is swingably mounted in the projecting lip 8 formed integral with clip 2. Permanently attached to the ring 7 at its outer side is a handle 9 whose upper end is furnished with or so formed as to provide a limit stop 10 adapted to engage the body side wall when the handle 9 is in its most efficient operative position, thereby preventing further outward movement of the handle.

Another modification of my invention is shown in Figs. 9 to 13 inclusive in which a container 11 is provided with a clip 12 (removable or not, as desired) and a handle 13 which has its upper end inserted under the clip 12 and shaped for coaction therewith, as described below. Resilient means is provided in the form of a leaf spring 14 having one end mounted in the cut-out 15 of handle 13 and its other end abutting the side wall of container 11 (as shown at Fig. 9) to maintain the handle 13 in its operative position. Figs. 14 to 15 illustrate a handle 16 having a tab 17 of such resilient character as to be adapted for use by turning same inwardly to function in a manner similar to spring 14 to maintain the handle in its spaced operative position. This type (Figs. 9–15) is particularly adapted for use on containers of scouring powder, seasonings, or the like when the article is in more or less constant use.

It is evident that various changes may be resorted to in the construction, form and arrangement of the several parts without departing from the spirit and scope of my invention, and hence I do not intend to be limited to the particular embodiments herein shown and described.

What I claim is:

1. The combination with a container body, of a removable resilient body engaging clip having a bent out portion, and a depending handle swung from said bent out portion, said handle terminating in an offset upper end portion, the upper extremity of the offset upper end portion engaging the top of said bent out portion, said upper extremity being normally adjacent to but out of contact with said body, the handle portion paralleling the body longitudinally when not in use, said offset upper end portion contacting the body and the bottom edge of said bent out portion when in use.

2. The combination with a container body, of a removable resilient body engaging clip having a bent out portion, and a depending handle swung from said bent out portion, said handle terminating in an offset upper end portion, the upper extremity of the offset upper end portion having its bottom face engaging the upper edge of the bent out portion, the portion of the offset upper end portion that is connected to the upper extremity being disposed substantially perpendicular thereto, the lower end portion of said perpendicular portion terminating in an angled connection with said handle, said angled connection engaging the body when the handle is disposed in a substantially parallel position with respect to the body of the container when the handle is not in use, said angled connection engaging the bottom edge of said bent out portion when the handle is in use.

3. A structure according to claim 2, in which the perpendicular portion is of a length corresponding to the height of the body engaging clip and is interposed between the bent out portion and the container body.

ROBERT S. BARBER.

REFERENCES CITED

The following references are of record in the file of this patent:

UNITED STATES PATENTS

| Number | Name | Date |
| --- | --- | --- |
| 1,667,973 | Kircher | May 1, 1928 |
| 2,069,037 | Jedlicka | Jan. 26, 1937 |
| 2,072,569 | Shoan | Mar. 2, 1937 |
| 2,101,526 | Bryant | Dec. 7, 1937 |
| 2,222,741 | Bush | Nov. 26, 1940 |
| 2,395,140 | Peterson | Feb. 19, 1946 |
| 2,441,892 | Mattoon | May 18, 1948 |